United States Patent
Karl et al.

(10) Patent No.: US 9,074,701 B2
(45) Date of Patent: Jul. 7, 2015

(54) SOLENOID VALVE

(75) Inventors: Andreas Karl, Benningen/Neckar (DE); Florian Richter, Hemmingen (DE); Oliver Holz, Altenriet (DE); Nicolas Houis, Bietigheim-Bissingen (DE); Joerg Fricke-Schmidt, Charleston, SC (US); Andrej Gardt, Heilbronn (DE); Elmar Vier, Freiberg A. N. (DE)

(73) Assignee: Robert Bosch GmbH, Stuttgart, DE (US)

( * ) Notice: Subject to any disclaimer, the term of this patent is extended or adjusted under 35 U.S.C. 154(b) by 352 days.

(21) Appl. No.: 13/519,304

(22) PCT Filed: Oct. 29, 2010

(86) PCT No.: PCT/EP2010/066451
§ 371 (c)(1), (2), (4) Date: Oct. 1, 2012

(87) PCT Pub. No.: WO2011/079980
PCT Pub. Date: Jul. 7, 2011

(65) Prior Publication Data
US 2013/0146796 A1    Jun. 13, 2013

(30) Foreign Application Priority Data

Dec. 28, 2009  (DE) .................... 10 2009 055 339

(51) Int. Cl.
*F16K 1/32* (2006.01)
*F16K 31/02* (2006.01)
(Continued)

(52) U.S. Cl.
CPC ............... *F16K 31/06* (2013.01); *B60T 8/363* (2013.01); *F16K 1/32* (2013.01); *F16K 31/0655* (2013.01)

(58) Field of Classification Search
CPC ......... F16K 1/32; F16K 1/42; F16K 31/0658; F16K 31/0686; B60T 8/363

USPC ................ 251/129.02, 129.15; 335/262–263
See application file for complete search history.

(56) References Cited

U.S. PATENT DOCUMENTS 5,076,538 A * 12/1991 Mohr et al. .............. 251/129.18
5,603,483 A * 2/1997 Reuter et al. ............. 251/129.02
(Continued)

FOREIGN PATENT DOCUMENTS

DE         197 16 856 A1    10/1998
DE   10 2007 007 784 A1     8/2008
(Continued)

OTHER PUBLICATIONS

International Search Report corresponding to PCT Application No. PCT/EP2010/066451, mailed Feb. 1, 2011 (German and English language document) (7 pages).

*Primary Examiner* — Marina Tiet Jen
*Assistant Examiner* — Seth W MacKay-Smith
(74) *Attorney, Agent, or Firm* — Maginot, Moore & Beck LLP

(57) ABSTRACT

A solenoid valve is disclosed that includes at least one chamber which can be filled with a fluid and which is provided in a housing of the solenoid valve, a closing piston which can be displaced by an actuation device and a spring element which can act against the actuation device. An annular element which divides the chamber into a first and a second subchamber is provided, said annular element being at least partially, in particular completely engaged in the axial direction by a closing piston of the solenoid valve arranged in a guide opening of the annular element and comprises at least one fluid passage recess which is different from the guide opening.

12 Claims, 2 Drawing Sheets

(51) Int. Cl.
   *H01F 7/16* (2006.01)
   *F16K 31/06* (2006.01)
   *B60T 8/36* (2006.01)

(56) References Cited

U.S. PATENT DOCUMENTS

| | | | | |
|---|---|---|---|---|
| 5,605,386 | A | * | 2/1997 | Ziegler et al. ............. 303/119.2 |
| 6,988,707 | B2 | * | 1/2006 | Ahn .......................... 251/129.15 |
| 7,871,056 | B2 | * | 1/2011 | Kratzer .................... 251/129.02 |
| 8,579,251 | B2 | * | 11/2013 | Ambrosi et al. ......... 251/129.02 |
| 8,651,453 | B2 | * | 2/2014 | Heyer et al. ............. 251/129.02 |
| 2005/0035320 | A1 | * | 2/2005 | Tsuchiya et al. ......... 251/129.02 |
| 2006/0017033 | A1 | * | 1/2006 | Voss ......................... 251/129.19 |
| 2007/0164244 | A1 | | 7/2007 | Kratzer |
| 2008/0197308 | A1 | * | 8/2008 | Guggenmos et al. .... 251/129.02 |
| 2008/0203343 | A1 | * | 8/2008 | Kratzer .................... 251/129.15 |
| 2010/0187459 | A1 | * | 7/2010 | Kratzer .................... 251/129.15 |
| 2010/0264342 | A1 | * | 10/2010 | Heyer et al. ............. 251/129.15 |
| 2011/0198522 | A1 | * | 8/2011 | Ambrosi et al. ......... 251/129.15 |

FOREIGN PATENT DOCUMENTS

| | | |
|---|---|---|
| EP | 0 423 755 A2 | 4/1991 |
| EP | 1 810 902 A2 | 7/2007 |
| JP | 3-134385 A | 6/1991 |
| JP | 2009-509110 A | 3/2009 |
| WO | 2007/033855 A1 | 3/2007 |

* cited by examiner

SOLENOID VALVE

This application is a 35 U.S.C. §371 National Stage Application of PCT/EP2010/066451, filed on Oct. 29, 2010, which claims the benefit of priority to Serial No. DE 10 2009 055 339.8, filed on Dec. 28, 2009 in Germany, the disclosures of which are incorporated herein by reference in their entirety.

The disclosure relates to a solenoid valve with at least one fluid-fillable chamber provided in a housing of the solenoid valve, with a closing piston displaceable by means of an actuation device, and with a spring element counteracting the actuation device.

BACKGROUND

Solenoid valves of the type initially mentioned are known from the prior art. They are used, for example, in driver assistance devices, such as, for example, ABS, TCS and ESP systems and the like. Such a solenoid valve may in this case be designed as a 2/2 way solenoid valve. This is also designated as a straight-way valve. Solenoid valves serve, above all, for metering a fluid. For this purpose, they have an actuation device, by means of which a through orifice of the solenoid valve can be at least partially opened or closed. The actuation device in this case comprises an electromagnet, that is to say the solenoid valve can be actuated electrically. A fluid connection between an inlet and an outlet of the solenoid valve can be made via the through orifice. In this case, in particular, there may be provision whereby the through orifice is closed in a position of rest of the solenoid valve and is opened by voltage being applied to the electromagnet. Alternatively, however, a reversed version is also possible, in which the through orifice is open in the position of rest of the solenoid valve and is closed only by the actuation device being actuated, that is to say, for example, by voltage being applied to the electromagnet.

Usually, there is provision for the solenoid valve to have a spring element counteracting the electromagnet. This spring element is arranged in the fluid-fillable chamber. It ensures that the solenoid valve remains in its position of rest or is returned to this when the actuation device is not activated. In this case, the spring element, for example a helical spring, acts, on the one hand, upon the actuation device and, on the other hand, for example, upon a sealing body with the restoring force. The sealing body is intended to cooperate with a closing piston displaceable by means of the actuation device, in order to close sealingly or to release at least partially the through orifice. For this purpose, the solenoid valve inlet or outlet, which can be closed by means of the closing piston, is arranged in the sealing body. In this case, on the one hand, the spring element extends through the entire chamber in order, on the one hand, to cooperate with the actuation device and, on the other hand, to be supported on the sealing body. The sealing body is thus acted upon with a force which can sometimes cause deformations of the sealing body which are possibly detrimental to the sealing action of the latter. The sealing body is also often composed of an elastic material, and it therefore cannot form a defined bearing surface for the spring element. On the other hand, the spring element is exposed to fluid forces which are caused by the inflow of fluid through the chamber. The flow connection between the inlet and the outlet of the solenoid valve is therefore made, in particular, via the chamber.

SUMMARY

By contrast, the advantage of the solenoid valve having the features mentioned herein is that the spring element is not exposed to any undesirable fluid forces and the sealing body is not acted upon by the closing piston with a force which deforms it. This is achieved, according to the disclosure, by means of a ring element which subdivides the chamber into a first and a second subchamber, is penetrated at least partially, in particular completely, in the axial direction by the closing piston, arranged in a guide orifice in the ring element, of the solenoid valve and has at least one fluid passage recess different from the guide orifice. The ring element is therefore arranged in the chamber or between the first and the second subchamber. In this case, both the first and the second subchamber can be filled with fluid in the same way as the entire chamber. Advantageously, the inlet and outlet are assigned to only one of the subchambers, while only the spring element, the actuation device and a region of the closing piston are provided in the other of the subchambers. The ring element may be interrupted in the circumferential direction, that is to say does not have to pass through the chamber completely, as seen in the circumferential direction. The ring element has the guide orifice in which the closing piston of the solenoid valve is arranged axially displaceably.

In this case, the closing piston penetrates through the ring element at least partially in the axial direction. Complete penetration is preferably provided. The guide orifice is adapted to the closing piston, that is to say has a similar diameter to the latter, so that the closing piston, although guided reliably in the ring element, is nevertheless displaceable in the axial direction. This also means, however, that the first and the second subchamber would be separated essentially fluidically from one another, that is to say no fluid exchange could take place between them. For this reason, the fluid passage recess is provided, which is different from the guide orifice, but in this case does not necessarily have to be spaced apart from the latter. The fluid passage recess allows fluid exchange between the first and the second subchamber. The function of the solenoid valve is thereby not impaired by the ring element. The ring element surrounds the closing piston at least in regions. It bears at least in regions against an inner wall of the housing or is supported on said inner wall or is held/fastened there. The ring element makes it possible to support the spring element securely, so that a reliable return or hold of the closing piston in its position of rest is implemented. In addition, what can thereby be achieved is that the spring element is not acted upon by undesirable fluid forces which occur, for example, when the fluid flows through the chamber.

In a development of features of the disclosure, the ring element is designed as a tension sleeve or clamping sleeve. Both the tension sleeve and the clamping sleeve are held by clamping in the chamber or on the inner wall of the housing. They therefore have the same dimensions as, preferably larger dimensions than the chamber in order to implement this clamping connection. The tension sleeve in this case has an axial slot which makes it possible to introduce it into the chamber in a simple way. By contrast, the clamping sleeve is designed without the axial slot, that is to say surrounds the closing piston completely in the circumferential direction.

In a development of features of the disclosure, the fluid passage recess is designed as a fluid passage pocket and/or penetrates through a basic body of the ring element at least partially in the radial direction. The fluid passage pocket is in this case designed in such a way that it is set back with respect to a circumferential surface of the ring element, that is to say the wall thickness of the ring element is reduced in the region of the fluid passage pocket. There may likewise be provision for the fluid passage recess to penetrate completely through the ring element in the radial direction. This is the case, for example, with regard to the tension sleeve in which the axial slot forms the fluid passage recess. The fluid passage recess makes the fluid connection between the first and the second subchamber independently of the guide orifice.

In a development of features of the disclosure, the fluid passage pocket is formed in an outer circumferential surface and/or inner circumferential surface of the ring element. If the fluid passage pocket is formed in the outer circumferential surface, it extends radially inward, and if it is provided in the inner circumferential surface it extends radially outward. The fluid passage pocket extends only partially over the outer circumferential surface or the inner circumferential surface.

In a development of features of the disclosure, the fluid passage pocket is channel-shaped, groove-shaped and/or notch-shaped. Basically, the fluid passage pocket may be shaped in any desired way. However, a channel, groove or notch shape is preferred. The channel shape in this case has a cross section which is round or oval at least in regions, the groove shape has an essentially rectangular cross section and the notch shape has an essentially triangular cross section.

In a development of features of the disclosure, at least one supporting web is formed next to the fluid passage pocket and bears against an inner wall of the housing. The supporting web ensures connection to the housing or to the inner wall of the housing and consequently the fastening of the ring element. The supporting web may have any desired width in the circumferential direction and be designed to be continuous or else interrupted in the axial direction. If a plurality of fluid passage pockets are provided, the supporting web is arranged in each case between these. In order to make as good a fluid connection as possible between the first and the second subchamber, it is advantageous if the overall cross section of the fluid passage pockets is larger than the overall cross section which is occupied by the at least one supporting web.

In a development of features of the disclosure, the fluid passage recess is provided as a fluid passage bore in the ring element. The fluid passage bore in this case penetrates completely through the ring element in the axial direction in order to make the fluid connection between the first and the second subchamber. In this case, the fluid passage bore may have a constant diameter or alternatively also different diameter in the axial direction. The design of the fluid passage recess or of the fluid passage bore thus makes it possible to implement a throttle between the first and the second subchamber. If a plurality of fluid passage bores are provided on the ring element, these may have identical or different diameters.

In a development of features of the disclosure, the fluid passage recess runs straight, obliquely and/or helically in the axial direction. The throughflow behavior of the fluid passage recess can be set by means of its run. The straight run of the fluid passage recess is preferred, but alternatively an oblique or helical run may also be provided.

In a development of features of the disclosure, a plurality of fluid passage recesses are provided so as to be distributed, in particular uniformly, over the circumference of the ring element. In order to achieve as good a flow connection as possible between the first and the second subchamber, a plurality of fluid passage recesses are preferably provided. These may be provided on the ring element in any desired way, but the arrangement distributed over the circumference is preferred, since an especially good throughflow with a low pressure loss is thereby achieved. This applies particularly when the fluid passage recesses are distributed uniformly.

In a development of features of the disclosure, the ring element possesses a supporting surface for the spring element of the solenoid valve. As already stated above, the ring element preferably serves for supporting the spring element. For this purpose, the supporting surface is provided which can be adapted to the spring element. In particular, the supporting surface may have means for fastening and/or guiding the spring element.

BRIEF DESCRIPTION OF THE DRAWINGS

The disclosure is explained in more detail below by means of the exemplary embodiments illustrated in the drawing, without any restriction of the disclosure occurring. In the drawing.

DETAILED DESCRIPTION

Figure 1:
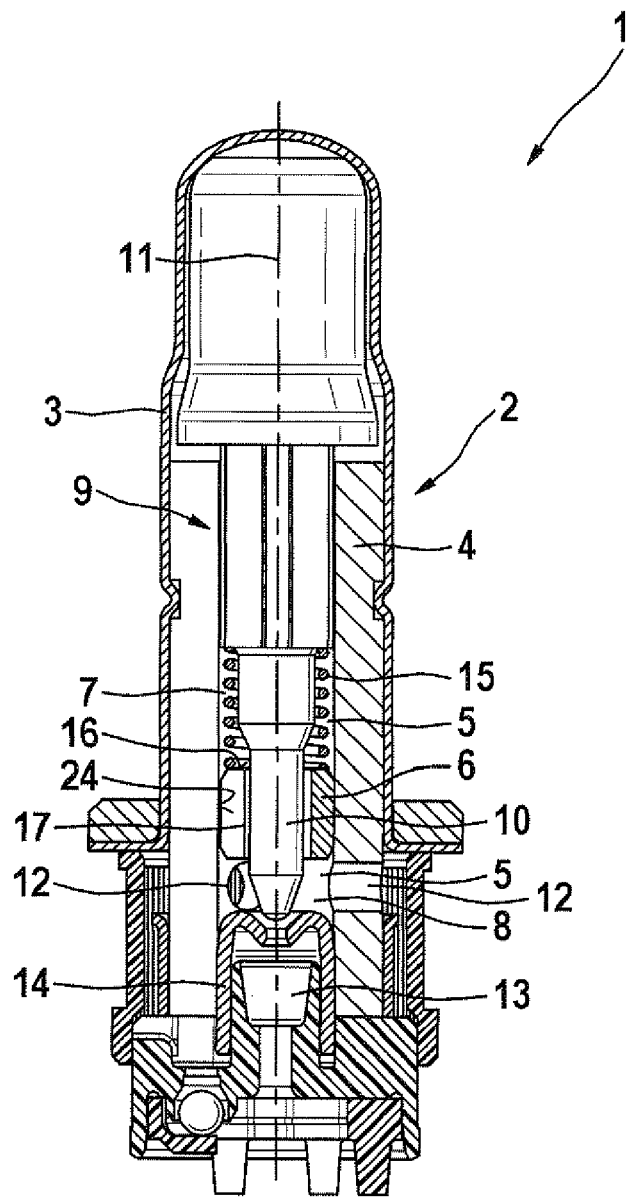
FIG. 1 shows a cross section of a solenoid valve with a ring element arranged in a chamber.

FIG. 1 shows a solenoid valve 1 with a housing 2 which is composed of a jacket 3 continuous at least in regions and of at least one structural element 4. Provided in the housing 2 of the solenoid valve 1 is a chamber 5 which is subdivided by a ring element 6 into a first subchamber 7 and a second subchamber 8. The solenoid valve 1 has, furthermore, an actuation device 9 which has at least one electromagnet (not illustrated here). By means of the actuation device 9, a closing piston 10 can be displaced in the axial direction with respect to a longitudinal axis 11 of the solenoid valve 1.

The solenoid valve 1 has an inlet 12 and an outlet 13 for fluid. A plurality of inlets 12 may also be provided, as illustrated in FIG. 1. The inlet 12 is fluid-connected permanently to the second subchamber 8. A fluid connection between the second subchamber 8 and the outlet 13 or between the inlet 12 and the outlet 13 can be closed or at least partially opened by means of the solenoid valve 1. For this purpose, the closing piston 10 cooperates with a sealing body 14. In a closing position, the closing piston 10 lies on the sealing body 14 in such a way that the fluid connection is interrupted. In an open position, by contrast, the closing piston 10 is displaced upward in the axial direction so that the fluid connection is released. In the embodiment of the solenoid valve 1 illustrated here, the open position corresponds to a position of rest of the closing piston 10. This means that the fluid connection between the inlet 12 and outlet 13 is present until the closing piston 10 is displaced in the axial direction by means of the actuation device 9, so that said closing piston moves towards the sealing body 14 and cooperates with the latter to interrupt the fluid connection. For this purpose, the first subchamber 7 has arranged in it a spring element 15 which is designed as a compression spring and which, on the one hand, exerts a restoring force upon the actuation device 9 and, on the other hand, is supported on the ring element 6. For this purpose, the ring element 6 has a supporting surface 16. Alternatively, the spring element 15 may also be in the form of a tension spring. In this case, the closing position is the position of rest.

By means of the supporting surface 16, on the one hand, reliable support of the spring element 15 is ensured and, on the other hand, the spring element 15 is in a region in which it is not acted upon by undesirable fluid forces. These fluid forces occur, for example, when the fluid flows through the solenoid valve 1 when the fluid connection between the inlet 12 and the outlet 13 is released. The closing piston 10 is mounted for axial guidance in a guide orifice 17 of the ring element 6. In this case, the ring element 6 surrounds the closing piston 10 at least in regions in the circumferential direction.

The closing piston 10 penetrates through the ring element at least partially, in particular completely, in the axial direction, as illustrated in FIG. 1. It has in this case a fluid passage recess 18 which cannot be seen here and which allows fluid connection between the first subchamber 7 and the second subchamber 8. This fluid connection is provided in order to allow reliable fluid exchange between the two subchambers 7 and 8 and consequently to ensure the displaceability of the closing piston 10 by means of the actuation device 9. If the fluid connection were not sufficient, a pressure would build up in the first subchamber 7 upon actuation of the actuation device 9 and would counteract the displacement of the closing piston 10. This is prevented by the fluid passage recesses 18. The fluid connection may also be implemented at least partially via the guide orifice 17. However, in order to enable the closing piston 10 to be guided reliably, it has at least similar dimensions to said guide orifice. For this reason, it is necessary to provide the passage recess 18 which is different from the guide orifice 17.

Figure 2:
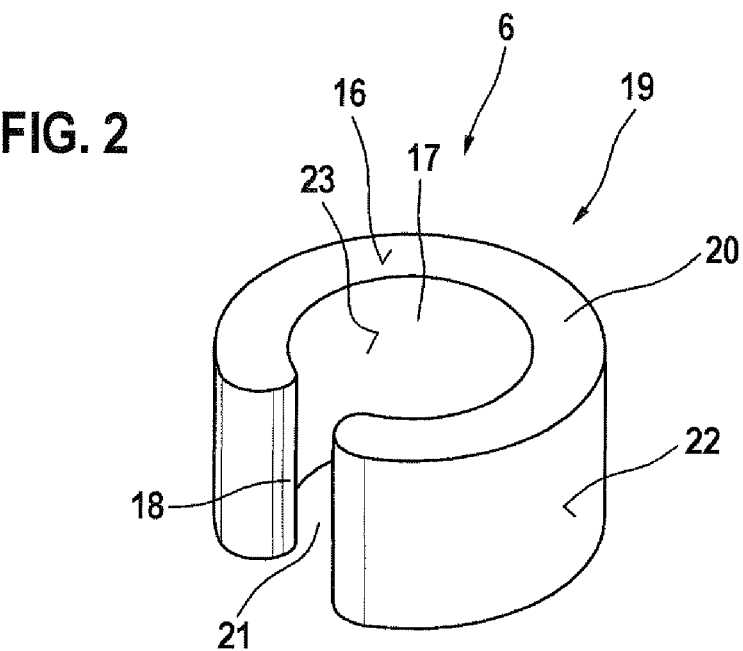
FIG. 2 shows a first embodiment of the ring element.

FIG. 2 shows a first embodiment of the ring element 6. In this embodiment, the ring element 6 is designed as a tension sleeve 19 which is round, particularly circular, in cross section, which means that an axial slot 21 is provided in a basic body 20 of the ring element 6. This axial slot 21 makes it possible to reduce the size of the ring element 6 in the radial direction when it is being mounted in the housing 2 of the solenoid valve 1. In this case, however, the axial slot 21 serves at the same time as a fluid passage recess 18. Moreover, the guide orifice 17 is provided in the basic body 20. In the embodiment present here, the fluid passage recess 18 therefore penetrates completely through the basic body 20 in the radial direction. In this case, said fluid passage recess issues both into an outer circumferential surface 22 and into an inner circumferential surface 23 of the ring element 6 and consequently into the guide orifice 17. The ring element 6 bears with the outer circumferential surface 22 against an inner wall 24 (see FIG. 1) of the housing 2 and is thus held in the chamber 5 such that it separates the two subchambers 7 and 8 at least partially from one another. Since the guide orifice 17 is filled essentially by the closing piston 10, the flow connection between the subchambers 7 and 8 is made via the axial slot 21 or the fluid passage recess 18.

Figure 3:
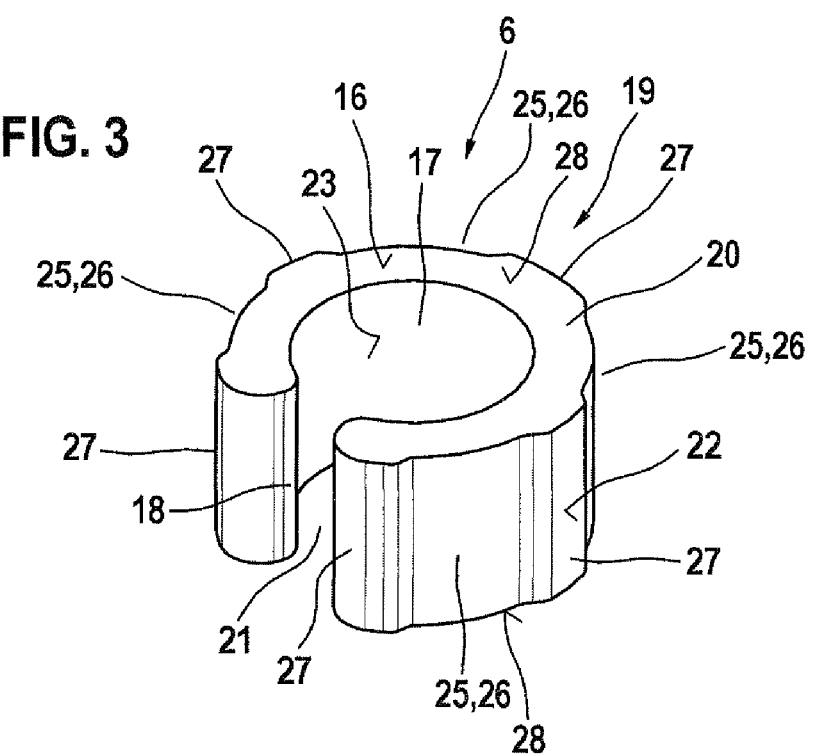
FIG. 3 shows a second embodiment of the ring element.

A further embodiment of the ring element 6 is shown in FIG. 3. In this case, it is designed again as a tension sleeve 19, that is to say has the axial slot 21 which serves as a fluid passage recess 18. Reference may be made thus far to the above description. Additionally, however, the ring element 6 has four further fluid passage recesses 26 which are formed in the outer circumferential surface 22. Alternatively, an arrangement of the fluid passage recesses 25 in the inner circumferential surface 23 may also be provided. The fluid passage recesses 25 are designed as fluid passage pockets 26. This means that they are set back in the radial direction with respect to the outer circumferential surface 22, so that a depression is formed in the basic body 20. The fluid passage pockets 26 are at least in regions of channel-shaped design.

Between the fluid passage pockets 26, supporting webs 27 are provided, via which the ring element 6 is connected to the inner wall 24 of the chamber 5 or of the housing 2 in order to hold or to fasten the ring element 6. The clamping connection of the tension sleeve 19 can thus be made via the supporting webs 27. Both the supporting webs 27 and the fluid passage pockets 26 are distributed uniformly over the circumference of the ring element 6. A reliable flow connection between the subchambers 7 and 8 is thereby made. In the exemplary embodiment illustrated, the fluid passage pockets 26 run in the axial direction straight through the ring element 6 or its outer circumferential surface 22. Alternatively, however, there may also be provision whereby the fluid passage pockets 26 have an oblique or helical run.

Additionally or alternatively, the fluid passage recesses 25 may be present as fluid passage bores (not illustrated). These are bores which issue into end faces 28 of the ring element 6 and in this case run through the basic body 20.

As compared with solenoid valves known from the prior art, the solenoid valve 1 has the advantage that the supporting surface 16 for the spring element 15 is provided and, moreover, the spring element 15 is arranged in a region of the solenoid valve 1 (to be precise, in the first subchamber 7), in which it is not impaired by undesirable fluid forces. This would be the case, for example, if the ring element 6 were not present and the spring element 15 would therefore have to be supported on the sealing body 14. The spring element 15 would then be arranged in the fluid connection between the inlet 12 and the outlet 13, so that the fluid flow through the solenoid valve 1 could influence the spring element 15 and its restoring force upon the actuation device 9 or the closing piston 10. This is avoided by the arrangement of the ring element 6, so that the solenoid valve 1 described above operates extremely reliably.

The invention claimed is:

1. A solenoid valve, comprising:
   a housing defining at least one fluid-fillable chamber,
   an actuation device,
   a closing piston displaceable by the actuation device,
   a spring element configured to counteract the actuation device, and
   a ring element configured to subdivide the chamber into a first subchamber and a second subchamber,
   wherein the ring element is penetrated at least partially in the axial direction by the closing piston,
   wherein the ring element includes a basic body that defines a guide orifice,
   wherein the closing piston is arranged in the guide orifice,
   wherein the ring element has at least one fluid passage recess different from the guide orifice, and
   wherein at least one of the at least one fluid passage recess is configured as a fluid passage slot that penetrates completely through the basic body of the ring element in both the radial direction and the axial direction such that the ring element forms a "C" shape.

2. The solenoid valve as claimed in claim 1, wherein the ring element is configured as a tension sleeve or clamping sleeve.

3. The solenoid valve as claimed in claim 1, wherein at least one of the at least one fluid passage recess is configured as a fluid passage pocket.

4. The solenoid valve as claimed in claim 3, wherein the at least one fluid passage pocket is formed in at least one of an outer circumferential surface and an inner circumferential surface of the basic body of the ring element.

5. The solenoid valve as claimed in claim 3, wherein the at least one fluid passage pocket is at least one of channel-shaped, groove-shaped and notch-shaped.

6. The solenoid valve as claimed in claim 5, wherein the ring element includes at least one supporting web that is formed next to the at least one fluid passage pocket and bears against an inner wall of the housing.

7. The solenoid valve as claimed claim 6, wherein at least one of the at least one fluid passage recess is configured as a fluid passage bore defined in the ring element.

8. The solenoid valve as claimed in claim 1, wherein at least one of the at least one fluid passage recess extends at least one of straight, obliquely and helically in the axial direction.

9. The solenoid valve as claimed in claim 1, wherein the at least one fluid passage recess includes a plurality of fluid passage recesses that are distributed over the circumference of the ring element.

10. The solenoid valve as claimed in claim 9, wherein the plurality of fluid passage recesses are uniformly distributed over the circumference of the ring element.

11. The solenoid valve as claimed in claim 1, wherein the ring element possesses a supporting surface that supports the spring element.

12. The solenoid valve as claimed in claim 1, wherein the ring element is penetrated completely in the axial direction by the closing piston.

\* \* \* \* \*